United States Patent

[11] 3,607,084

| [72] | Inventors | Robert J. Mackey<br>Morton Grove;<br>Ihor B. Karpowycz, Chicago, both of Ill. |
|---|---|---|
| [21] | Appl. No. | 780,476 |
| [22] | Filed | Dec. 2, 1968 |
| [45] | Patented | Sept. 21, 1971 |
| [73] | Assignee | Sun Electric Corporation |

[54] COMBUSTIBLE GAS MEASUREMENT
21 Claims, 4 Drawing Figs.

[52] U.S. Cl. ................................................ 23/232,
23/254, 23/255, 73/27, 117/227, 252/462, 252/472
[51] Int. Cl. ........................................ B01j 11/12,
G01n 31/10, G01n 31/12
[50] Field of Search .......................................... 23/232, 232
E, 254, 254 E, 255, 255 E, 2.2, 288.3; 73/27;
252/462, 472; 117/227, 231

[56] References Cited
UNITED STATES PATENTS
2,030,283  2/1936  Rewal ........................... 252/462 X
2,273,981  2/1942  Morgan et al. .................. 23/232 E

*Primary Examiner*—Morris D. Wolk
*Assistant Examiner*—R. M. Reese
*Attorney*—Molinare, Allegretti, Newitt & Witcoff ABSTRACT: The measurement of combustible gases comprises passing a stream of gas containing the combustible gases over a conductive metal wire coated with a thin catalytic coating of a mixture of thorium oxide and black palladium powder and/or black platinum powder. Electrical current is passed through the conductor wire to raise the temperature of the wire to a first temperature at which the oxidation of the combustible gases is initiated in the presence of the catalytic effect produced by the coating. The oxidation of the combustible gases substantially elevates the temperature of the conductor wire, changing its electrical resistance, the amount of heat generated during oxidation being directly proportional to the quantity of combustible gases in the gas stream. The metal conductor wire is preferably formed of a base metal in which the change in resistivity between the first and elevated temperatures is substantially equal to or greater than the change in resistivity of platinum between those temperatures.

INVENTORS
ROBERT J. MACKEY &
BY IHOR B. KARPOWYCZ
Bair, Freeman
& Molinare ATTORNEYS

COMBUSTIBLE GAS MEASUREMENT

BACKGROUND OF THE INVENTION

The invention relates to the measurement of combustible gases and, more particularly, to a method and apparatus for measuring the quantity of combustible gases in a volume of gas.

In the past the quantity and/or percentage measurement of combustible gases in a volume of gas or a gas stream has been accomplished by platinum wire cells in which an electric current carrying solid platinum wire or coil of a known diameter and length is located the stream containing the combustible gas to be measured. The temperature of the platinum wire is raised to a temperature at which oxidation of the combustible gases present in the gas stream occurs, the heat of combustion of the gases further raising the temperature of the platinum wire. As the temperature of the wire increases, the electrical resistance of the wire changes and the resistance change in the wire is then measured with a Wheatstone bridge or other resistance measuring instrument calibrated in terms of the quantity of combustible gases present in the stream.

The prior measurements employing a solid platinum wire element suffer a number of disadvantages. Since platinum is both a scarce and an expensive metal, its in a substantially increased per unit cost of the measurement cells. Moreover, platinum wire looses its elasticity when exposed to elevated temperature during combustion of the combustible gases in the stream. This loss of elasticity is permanent and may cause shorting of adjacent coil turns, thus changing resistance and resulting in faulty indication. The loss of elasticity also causes sagging of the wire which in time stretches and causes a resistance change due to the change in the physical dimensions of the wire. Also where the platinum wire is employed in the measurement of the quantity of CO, $H_2$ and $H_xC_n$ for example, the temperature of the wire or coil must be raised to at least 250° C. in order to initiate complete oxidation of the gases.

The combustible gas measurement method and apparatus of our invention obviates the numerous disadvantages of the prior measurements employing solid platinum wire or coil elements. In the combustible gas measurement method and element of our invention, the use of an inexpensive, readily available base metal wire is made possible. The combustible gas measurement method and apparatus of our invention is capable of substantially increased sensitivity as compared to the prior solid platinum methods and devices while making possible a measurement device having a considerably decreased per unit cost. The measurement element constructed in accordance with the principles of our invention provides increased rigidity and strength over the range of temperatures encountered during operation, resulting in appreciably improved accuracy and a substantial reduction of undesirable resistance drift caused by variation of the physical shape of the coil or wire during operation and continued use over a period of time. Moreover, the coating on the conductor wire or coil employed in the method and the apparatus of our invention economically provides for the optimum effect of the catalyst. The apparatus and method of our invention also makes possible a reduction in the temperature at which oxidation is initiated. Such reduction, in turn, results in a generally expanded temperature range during operation. Finally the gas measurement device constructed in accordance with the principles of our invention makes possible the use of a variety of base metal wires which are capable of substantially increased sensitivity as well as ease of fabrication, e.g. soldering, brazing and winding.

SUMMARY OF THE INVENTION

In a principal aspect, the method of measuring the quantity of combustible gases following the principles of our invention comprises elevating the temperature of the gas to be measured to a first temperature and contacting the volume of gas with a catalytic mixture of a metal oxide and a powdered metal of the platinum group, the first temperature being such as to initiate oxidation of the combustible gases in the presence of the catalytic mixture of metal oxide and platinum group metal. Oxidation of the combustible gases operates to elevate the temperature of the gas to a second higher temperature and the change in temperature is sensed to measure the quantity of combustible gases in the volume of gas.

In another principal aspect, an element for measuring the quantity of combustible gases in a volume of gas which is constructed in accordance with the principles of our invention comprises a metallic conductor having a rigid catalytic coating of mixture of a metal oxide and a powdered metal of the platinum group.

Also a system for measuring the quantity of combustible gases in a volume of gas incorporating the principles of our invention comprises a chamber having a pair of wires located in the chamber, the chamber containing the volume of gas. One wire is coated with a catalytic mixture comprising a metal oxide and a powdered metal of the platinum group and an electrical power supply means is provided to supply an electrical current flow through the wire. Heating means elevates the temperature of the volume of gas to a first temperature where the combustible gases are oxidized in the presence of the catalytic mixture of metal oxide and platinum group metal and measuring means measures the electrical resistance change in the wire caused by the elevation of temperature due to the oxidation.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF PREFERRED EMBODIMENTS

Figure 1:
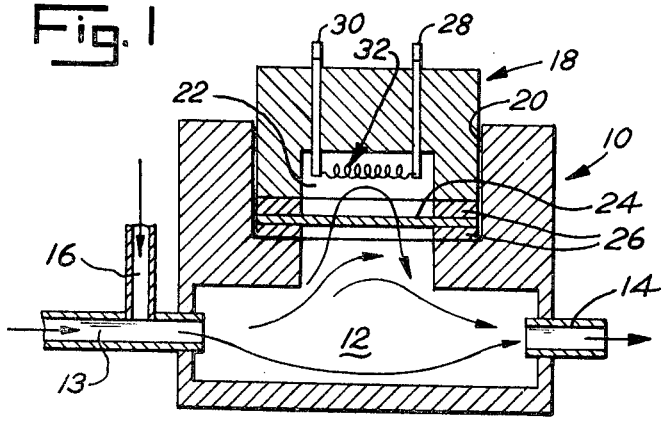
FIG. 1 is an overall cross-sectioned view of a preferred embodiment of combustible gas measuring apparatus constructed in accordance with the principles of our invention.

Referring to FIG. 1, a housing 10 is shown which comprises a chamber 12 and an inlet 13 and outlet 14 for introduction and removal of a stream of gas in which the quantity of combustible constituents is to be measured. The gases introduced through the inlet 13 may be, by way of example, the exhaust gases of a combustion engine which may contain varied amounts of unburned combustible CO, $H_2$ and $C_xH_n$. The inlet 13 includes an appropriate fitting 16 for introducing sufficient air or oxygen to the inlet stream to provide for complete oxidation of the combustible gases present in the stream as will late be described. An element housing 18 is carried in a recess 20 formed in housing 10, and includes a cavity 22 facing the chamber 12. The cavity 22 is separated from the chamber 12 by a suitable permeable partition 24, such as a filter paper, which prevents entry of various contaminating solids and other foreign matter into the cavity from chamber 12. The partition 24 is sandwiched between a pair of suitable gaskets 26 to provide a seal, the partition being sufficiently permeable to provide ready ingress and egress of gases between the cavity 22 and the chamber 12. A pair of conductive mounting posts 28 and 30 extend through and are carried on the element housing 18 and a gas measurement resistance element wire or coil 32 is attached between each of the posts by suitable means, such as by spot welding or soldering.

Figure 2:
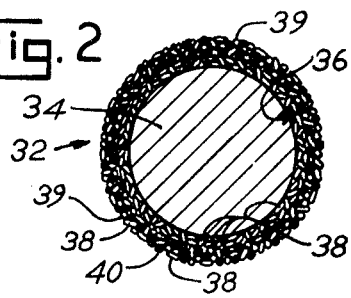
FIG. 2 is an enlarged cross-sectioned view of the measuring element of our invention.

Referring to FIG. 2, the resistance element 32 comprises a metallic conductor wire or core 34 which map be either a straight wire or be coiled. The wire 34 is of a predetermined diameter of about 0.002–0.004 inch and a predetermined length and is preferably composed of one of a number of metals having a substantially high change of resistivity over a given range of temperature change. By way of example, a preferred conductor wire may be composed of titanium, tantalum, columbium, nickel, or various nickel alloys such as Balco, Monel and Nial. A thin coating 36 of thorium oxide 38 paste and powdered metal of the platinum group, such as black platinum or a mixture of powdered black platinum 39 and black palladium 40, is coated on the conductor wire 34 over the surface which is exposed to the gas in cavity 22. The thickness of the coating is preferably in the order of 0.001 inch thick and the ratio of thorium oxide to platinum metal of 1:1 has been found to be satisfactory. The mixture of thorium oxide and powdered platinum group metal may be coated on the element by a number of methods including electrophoresis, brushing or dipping.

Figure 3:
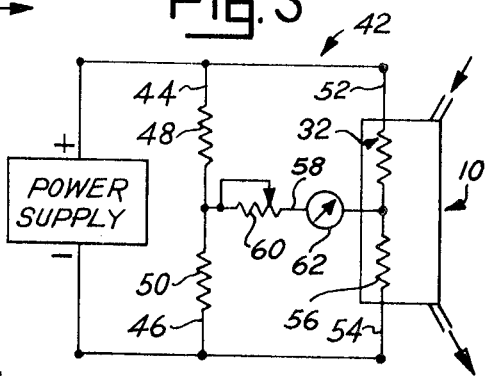
FIG. 3 is a circuit diagram of a preferred embodiment of gas measurement circuit of our invention.

Referring to FIG. 3, a preferred embodiment of measurement circuit is shown for determining the quantity of combustible gas in the volume of gas to be analyzed. The circuit includes a constant current or voltage DC power supply and a Wheatstone bridge 42. The Wheatstone bridge includes a pair of legs 44 and 46 each having a fixed precision resistor 48 and 50 and a second pair of legs 52 and 54, leg 52 including the gas measurement resistance element 32 and leg 54 including a reference resistance element 56, element 56 acting as a reference standard during operation. Both elements 32 and 56 are located in the gas stream in housing 10. A fifth leg 58 extends between the junctions of legs 44 and 46 and 52 and 54, respectively, and includes a variable resistor 60 and a galvanometer 62 for measuring the resistivity change in element 32.

To construct the gas measurement resistance element 32 and the reference element 56, wires of known and substantially the same length and diameter and of one of the aforementioned metals rare each attached between mounting posts as previously described. The wire of the measuring element 32 is coated with a thorium oxide paste either by brushing, dipping or by electrophoresis. Although it is not necessary, the wire of the reference element 56 may also be coated with the thorium oxide coating. The gas measurement resistance element 32 is then coated either with powdered black platinum or a mixture of powdered black palladium and powdered black platinum which is suspended in a suitable liquid, this plating step being accomplished by either alladium platinum are employed, a mixture of equal parts of each has been found to be satisfactory. Both the measuring element 32 and the reference element 56 are then positioned in the cavity 22, as shown FIG. 1, and the coated elements are aged for a short period of time by applying an electric current through the circuit. The gas measurement device is now ready for operation.

By way of example, the operation of the gas measurement apparatus will be described in terms of the analysis of the exhaust gases of a combustion engine where a determination of the percentage of combustible gases in the exhaust stream is to be made. Such combustible gases, if present, will generally be CO, $H_2$ and $C_xH_n$. The exhaust gas stream which is to be analyzed is introduced into the chamber 12 via inlet 13. A sufficient amount of air or oxygen is also introduced into the gas stream through fitting 16 to insure complete oxidation of the combustible gases in the stream. The gas to be analyzed passes through the partition 24 and into cavity 22 and contacts the measurement resistance element 32 which has previously been raised to a temperature of approximately 200° C. The temperature of both the gas measuring resistance element 32 and the air cell resistance element 56 are heated to that temperature by passing a sufficient current from the power supply through legs 52 and 54 of the Wheatstone bridge 42. A temperature of 200° C. is sufficient to initiate the catalytic oxidation of the combustible gases, such temperature being substantially lower than the 250° C. minimum temperature necessary to initiate complete catalytic oxidation in the prior uncoated solid platinum wire devices. In fact it has been found that such reduction in temperature is realized even where a conductor wire 34 of solid platinum, such as the wire previously employed, is coated with the catalytic coating of our invention. The heat of combustion produced by the catalytic oxidation of the combustible gases causes a substantial temperature elevation of the gas measurement resistance element 32 and its conductor wire 34, the elevation in temperature substantially changing the electrical resistivity of the conductor wire 34. Where, by way of example, the current flow through the conductor wire 34 is constant, the substantial resistivity change effects a substantial change in voltage across the element 32, the change in voltage being measured by the galvanometer 62. Since the quantity of heat produced by the oxidation of the combustible gases is directly proportional to the percentage of such gases in the gas stream, the degree of galvanometer deflection is a function of the temperature change of the conductor wire 34 produced by the heat and, in turn, the quantity of combustible gases in the gas stream.

By way of example the following table is shown to more clearly indicate the performance and sensitivity of a few selected preferred conductor wire compositions of our invention:

|  | Wire composition | | | | |
| --- | --- | --- | --- | --- | --- |
|  | 1 | 2 | 3 | 4 | 5 |
|  | Coated S.S. T 434 | Coated Balco 70% Ni-30% Fe | Coated Pt | Uncoated Pt | Uncoated Pt |
| Wire dia., in | .003 | .003 | .003 | .003 | .003 |
| Coil dia., in | .018 | .018 | .018 | .018 | .018 |
| No. turns | 10 | 10 | 15 | 15 | 15 |
| Length, in | 0.75 | 0.75 | 1.06 | 1.06 | 1.06 |
| $\rho_A$ | 77.2 | 38.6 | 17.6 | 19.0 | 20.5 |
| $\rho_E$ | 100.4 | 89.8 | 28.6 | 29.0 | 28.5 |
| $\Delta_\rho = \rho_E - \rho_A$ | 23.2 | 51.2 | 11.0 | 10.0 | 8.0 |
| $T_A$ | 208 | 211 | 201 | 240 | 280 |
| $T_E$ | 523 | 530 | 505 | 515 | 500 |
| $\Delta T = T_E - T_A$ | 315 | 329 | 304 | 275 | 220 |

Where:
$\rho_A$ is the conductor wire in air;
$\rho_E$ is the electrical resistivity in micro-ohm-cm. of the conductor wire in exhaust;
$T_A$ is the starting temperature in °C. of the conductor wire in air; and
$T_E$ is the finishing temperature in °C. of the conductor wire in exhaust.

In each of the above examples, the values are given for a standard reference mixture of gas containing 10% CO as the combustible gas. In columns 4 and 5, the resistance element is an uncoated solid platinum wire of the type utilized in prior measurement devices.

Upon considering the above table, it will be evident that the minimum temperature necessary to initiate oxidation is less in the case of the various coated conductor wires including the coated platinum wire, than in the case of the uncoated solid platinum conductor wires. The starting temperatures $T_A$ are not intended to be a representation of the exact minimum starting temperatures necessary to initiate complete combustion, but are merely tabulated for comparative purposes. A comparison of columns also demonstrates the substantially greater temperature changes experienced in the case of the coated wires relative to the uncoated wires, the greater temperature change causing a greater change in the resistivity and, in turn, providing a more sensitive measurement of the quantity of combustible gases present in the gas stream.

Figure 4:
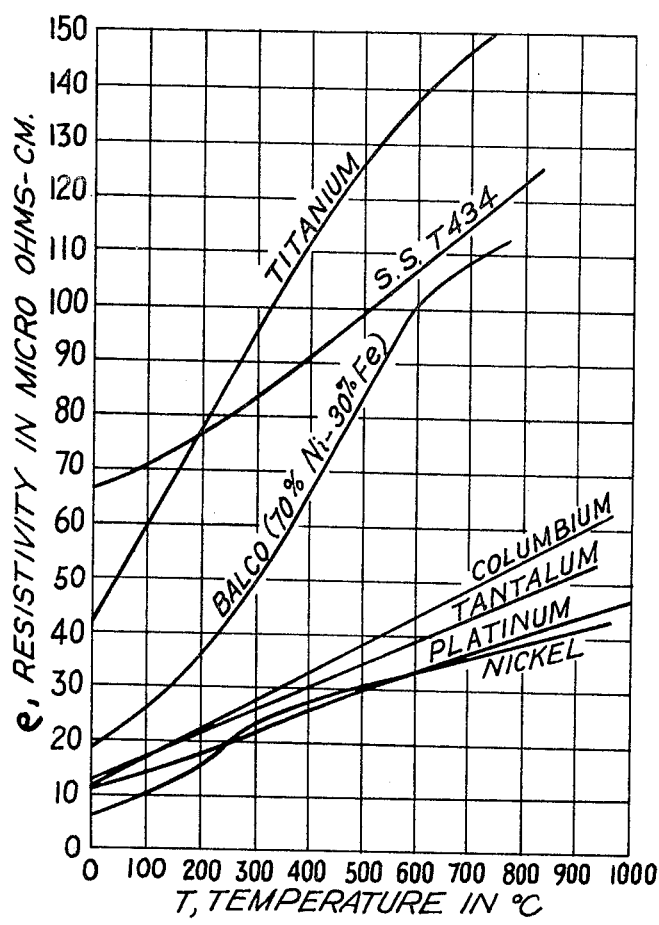
FIG. 4 is a plot of temperature v. electrical resistivity for a plurality of various preferred conductor element wires which may be employed in the method and apparatus of our invention.

Referring to FIG. 4, plots of temperature v. electrical resistivity of platinum and a number of other preferred base metal wire compositions are shown, including titanium, stainless steel (T434), Balco (70% Ni–30%Fe), columbium, tantalum and nickel. The metals plotted are intended to be representative and are not intended to be an all-inclusive compilation of the various metals contemplated. All of the plotted metals have in common a substantially low cost compared to platinum, even though nickel has slightly less responsive resistivity change characteristics. In addition to reduced cost, titanium, T434 stainless steel, and Balco display greatly increased resistivity change characteristics compared to platinum for a given temperature change and are thus substantially more sensitive to small variations in combustible gas quantity in the gas stream. Moreover, in addition to the highly desirable sensitivity and cost advantages, the base metal conductor wires, and particularly Balco and S.S. T 434 wires, are obtainable in consistent uniformity, display superior physical strength over the wide range of temperatures to which they are exposed in operation and are readily capable of being fabricated, i.e. coiled, welded and soldered. It will be evident that if sensitivity is not important in a particular use, wires composed of a material having a lesser resistivity response may be employed.

It should be understood that the embodiments of the invention which have been described are merely illustrative of a few of the applications of the principles of the invention. Numerous modifications may be made by those skilled in the art without departing from the true spirit and scope of the invention.

What is claimed is:

1. A method of measuring the quantity of combustible gases in a volume of gas comprising the steps of:
   elevating the temperature of the volume of gas to a first temperature,
   contacting the volume of gas with a catalytic mixture of metal oxide and a powdered metal of the platinum group,
   raising the temperature of the volume of gas to a second temperature greater than said first temperature by oxidizing the combustible gases in the volume of gas, said first temperature being sufficient to initiate the oxidation of said combustible gases in the presence of said catalytic mixture of metal oxide and powdered platinum group metal, and
   sensing the temperature change of said volume of gas between said first and second temperatures to measure the quantity of combustible gases in said volume of gas.

2. The method of claim 1 where said powdered platinum group metal is a metal selected from the group consisting of black platinum, black palladium and mixtures thereof.

3. The method of claim 1 wherein the temperature change is sensed by heating a base metal conductor from said first temperature to substantially said second temperature and measuring the change in electrical resistivity of said metallic conductor between said first and second temperatures.

4. The method of claim 3 wherein said metallic conductor is a base metal selected from the group consisting of titanium, stainless steel, and a nickel alloy.

5. The method of claim 4 wherein said stainless steel is T 434 and said nickel alloy is 70% nickel and 30% iron.

6. The method of claim 3 wherein said base metal conductor is a metal in which the change in electrical resistivity between said first and second temperatures is substantially equal to or greater than the change in resistivity of platinum between said temperatures.

7. The method of claim 1 wherein said metal oxide is thorium oxide.

8. The method of claim 1 wherein said volume of gases are exhaust gases from a combustion engine and said combustible gases generally comprise at least one of CO, $H_2$ and $C_xH_n$.

9. An element for measuring the quantity of combustible gases in a volume of gas comprising,
   a metallic conductor, and
   a rigid coating on said conductor comprising a catalytic mixture of a metal oxide and a powdered metal of the platinum group.

10. The measuring element of claim 9 wherein said metallic conductor is a metal in which the change in electrical resistivity when the metal is heated over a given temperature range is substantially equal to or greater than the change in resistivity of platinum when platinum is heated over said given temperature range.

11. The measuring element of claim 9 wherein said metallic conductor is a base metal selected from the group consisting of titanium, stainless steel, and a nickel alloy.

12. The measuring element of claim 11 wherein said stainless steel is T 434 and wherein said nickel alloy is 70% nickel and 30% iron.

13. The measuring element of claim 9 wherein said powdered platinum group metal is a metal selected from the group consisting of black palladium, black platinum and mixtures thereof.

14. The measuring element of claim 9 wherein said metal oxide is thorium oxide.

15. A system for measuring the quantity of combustible gases in a volume of gas comprising:
   a chamber for containing the volume of gas,
   a pair of electrically conductive metallic wires located in said chamber in the volume of gas,
   electric power supply means for supplying an electric current flow through said wires,
   a coating on one of said wires substantially entirely covering the surface of said wire exposed to said volume of gas, said coating comprising a catalytic mixture of a metal oxide and a powdered metal of the platinum group,
   heating means for elevating the temperature of said volume of gas to a first temperature at which the combustible gases in the volume of gas are oxidized in the presence of said catalytic mixture of metal oxide and platinum group metal, and
   measuring means for measuring the electrical resistance change in said one wire caused by the elevation in temperature of said wire from said first temperature to a higher temperature due to the heat of combustion produced by the oxidation of the combustible gases.

16. The system of claim 15 wherein said measuring means comprises a Wheatstone bridge, said pair of metallic wires comprising one of the resistances therein.

17. The system of claim 15 wherein said metallic wire is a metal in which the change in electrical resistivity between said first and higher temperatures is substantially equal to or greater then the change in resistivity of platinum between said temperatures.

18. The system of claim 15 wherein said wire is a base metal selected from the group consisting of titanium, stainless steel and a nickel alloy.

19. The system of claim 15 wherein said powdered platinum group metal is selected from the group consisting of black palladium, black platinum and mixtures thereof.

20. The system of claim 19 wherein said metal oxide is thorium oxide.

21. The system of claim 15 wherein said heating means comprises said conductive metallic wire, said power supply means heating said metallic wire to substantially said first temperature to initiate the oxidation of the combustible gases.